July 17, 1928.                                                    1,677,171
W. F. J. CASEY ET AL
BEARING
Filed May 23, 1925          2 Sheets-Sheet 1
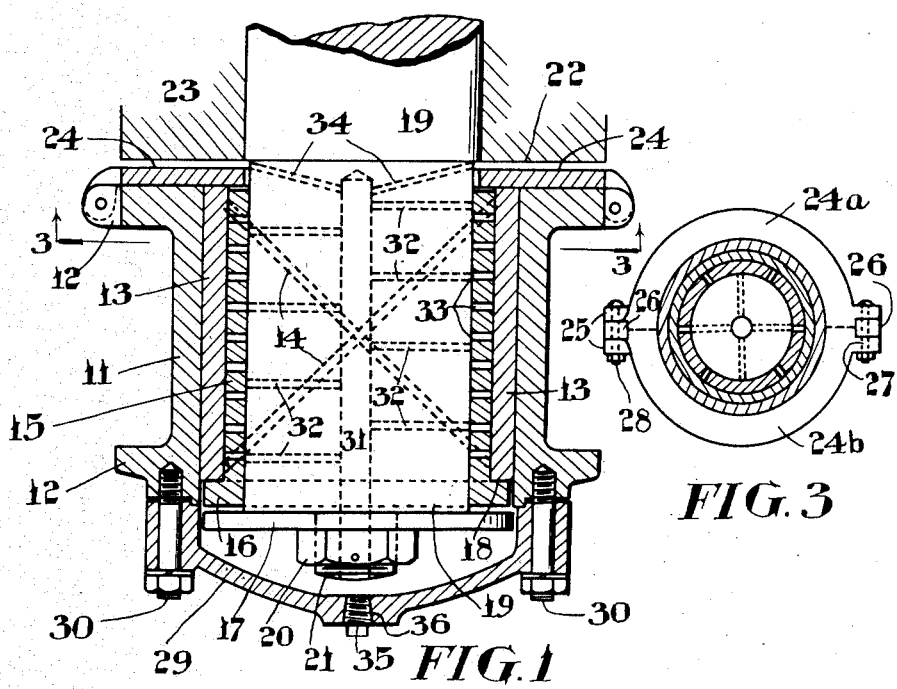
FIG.1
FIG.3
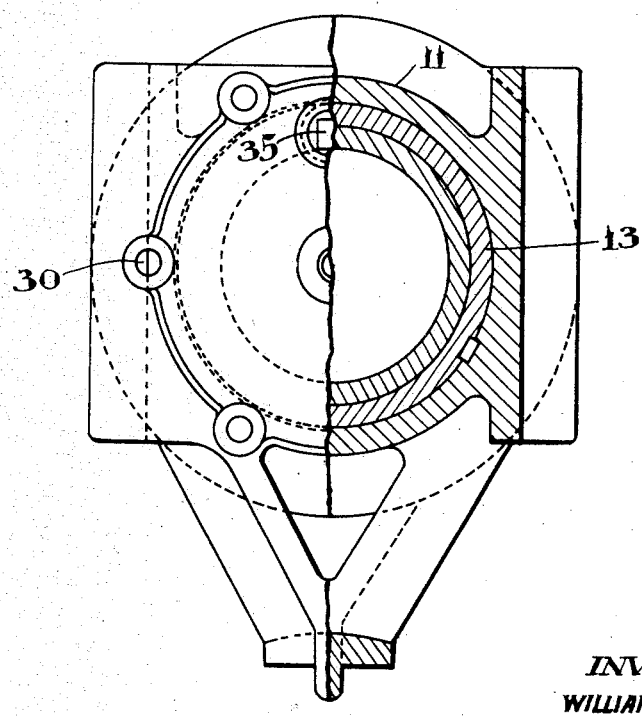
FIG.2
INVENTORS
WILLIAM.F.J.CASEY
GUSTAVE.CAVIN
CHARLES.E.BROOKS
BY Fetherstonhaugh & Co
ATTORNEYS

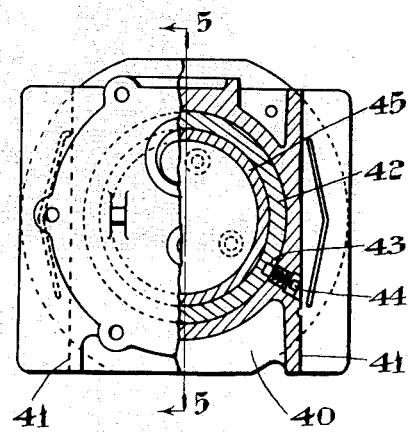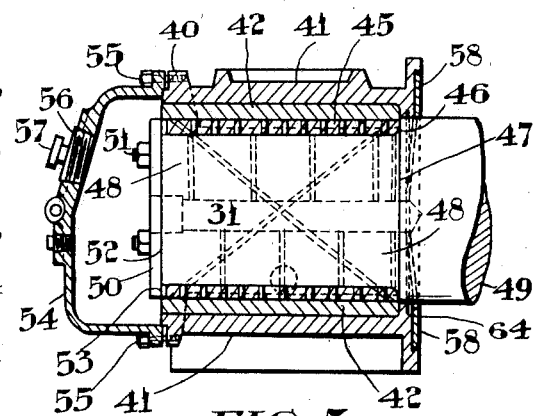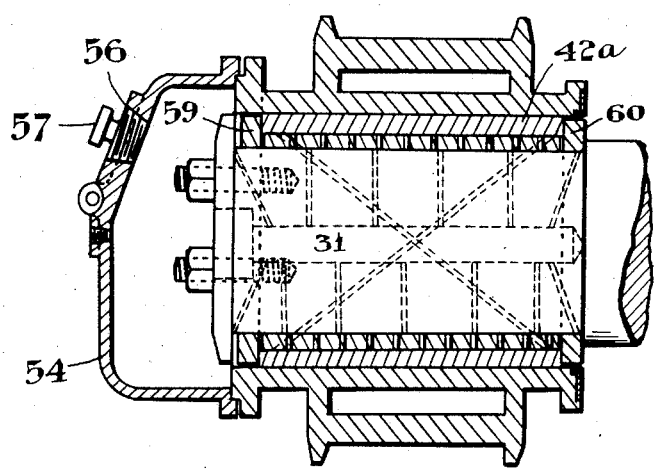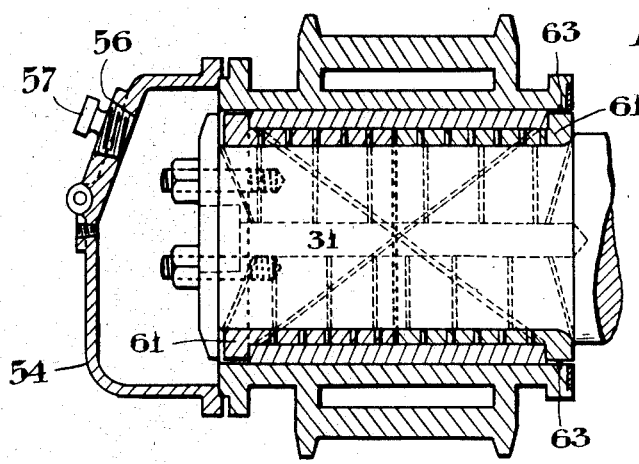

Patented July 17, 1928.

1,677,171

UNITED STATES PATENT OFFICE.

WILLIAM F. J. CASEY AND GUSTAVE CAVIN, OF KINGSTON, ONTARIO, AND CHARLES E. BROOKS, OF MONTREAL, QUEBEC, CANADA; SAID CAVIN AND SAID BROOKS ASSIGNORS TO SAID CASEY.

BEARING.

Application filed May 23, 1925. Serial No 32,373.

This invention relates to new and useful improvements in bearings and particularly journal bearings for railway bogie axles and the like and the object of the invention is to provide a simple bearing of the class stated which will be highly efficient in operation.

Another object is to provide a bearing in which the longitudinal movement of the axle will assist in forcing the lubricant between the bearing surfaces.

A further object is to provide a bearing which will be easily repaired and in which the wearing portions will be easily replaced.

A still further object is to provide a bearing in which the possibility of binding or seizing will be greatly reduced.

The above objects are attained by placing a rotatably mounted bushing between the journal and a liner which is secured, or held in position by any suitable means, to the main body of the bearing. The lubricant for the bearing is placed in the cap or cover and is pumped through the bearing by the movement of the axle, suitable means being provided to distribute said lubricant to the most vital parts of the bearing.

In the drawings:

Figure 1 is a sectional plan of our preferred form of bearing.

Figure 2 is a partial sectional end elevation of the bearing shown in Figure 1.

Figure 3 is a reduced sectional elevation taken on the line 3—3 Figure 1.

Figure 4 is a partial sectional end elevation of a modified type of bearing.

Figure 5 is a sectional side elevation of the bearing shown in Figure 4, said section being taken on the line 5—5.

Figures 6 and 7 are sectional elevations of other modified types of our improved bearing.

Referring more particularly to the drawings, and more particularly to Figures 1 to 3 inclusive, 11 designates a journal bearing casting having outwardly extending ribs 12 adapted to embrace the outer and inner face of guides formed in a bogie frame (not shown). Keyed or otherwise secured to the casting is the cylindrical liner 13 which may be made of cast iron or such like material. Formed or cut in the bore of the liners are the spiral grooves 14 which distribute the lubricant over the surface of the bearing. Rotatably mounted in the liner is a flanged cylindrical bushing 15, the flange 16 of which frictionally engages with the washers 17 and the ends 18 of the liner 13. The washer is secured to the end of the axle 19 by means of the nut 20, the threaded portion of which engages with a corresponding threaded reduced portion 21 of the axle 19. The face 22 of the hub 23 of a wheel (not shown) bears against a friction washer 24 which prevents undue wear on the inner face of the bearing. To facilitate removal of the washer 24 it is constructed as shown in Figure 3, that is, it is made in halves designated $24^a$ and $24^b$. Projecting outwardly from the periphery of the washer are the lugs 25 which, when in the assembled condition, are adapted to embrace the lugs 26 formed integral with and projecting outwardly from the edge of the bearing. The lugs 25 and 26 are provided with apertures 27 through which bolts 28 may be placed to hold the washer in its correct position. The washer 24 may be made in a variety of ways well known in the art to perform the duty of a thrust washer and this construction may be subject to modification according to requirements. The journal bearing may be provided with a cap 29 which may be secured to the outer face of the bearing by means of the studs 30 or stud bolts. The cap forms a reservoir for a lubricant. The inner surfaces of the bushing may be lubricated in the following manner. A hole 31 is drilled in the end of the axle and extends approximately the full length of the journal, and a plurality of smaller holes 32 are drilled radially from the centre of the axle so that lubricant may flow freely from the end of the axle through the holes 31 and 32 to the inner surface of the bushing. A plurality of holes 33 are drilled in the wall of the bushing to lubricate the inner surface of the liner which is provided with spiral grooves for distributing the lubricant. Holes 34 may also be drilled in the axle to carry part of the lubricant from the hole 31 to the contacting surface of the friction washer 24 and the hub of the travelling wheel. A removable plug 35 is secured to the threaded aperture 36 in the cap, said aperture forming means for feeding lubricant to the bearing and also for inspecting the condition of the bearing without removing the cap. Between the bearing and the cap oil tight joints must be made to prevent leakage of the lubricant. The foregoing is one manner of accomplishing our invention but modifications may be made such as are shown in Figures 4 to 7 inclusive, without departing from the spirit of the invention.

In the modification shown in Figures 4 and 5, 40 indicates a journal bearing casting suitable for railway rolling stock, said casting being provided with channel shaped guides 41 adapted to slide in suitable framing (not shown). Secured to the inner wall of the bearing is the cast iron liner 42 which may be held in position by means of the key 43 which extends longitudinally of the bearing. We have shown the key with half its depth sunk into the liner and the other half sunk into the bearing. Rotatably mounted within the liner is the cylindrical bushing 45, the inner end 46 of which may be rounded off in the usual manner to fit against the rounded shoulder 47 of the journal 48 of the axle 49. To prevent longitudinal movement of the bushing with respect to the axle, the bushing is made approximately the same length as the journal 48 and a keeper plate 50 is secured to the end of the axle by means of the screws 51 in such a manner that the inner face 52 of the keeper plate frictionally engages with the end 53 of the bushing. The cap 54 is provided for the end of the bearing 40 and may be secured thereto by means of the studs or bolts 55. The cap is slightly different in shape from that shown in Figures 1 to 3 inclusive, but acts in a similar manner, as a reservoir for the lubricant, and suitable openings 56 may be provided for feeding lubricant to the reservoir and also for inspection purposes. The opening may be closed when not required by means of the plug 57. Instead of providing a friction washer for the inner face of the bearing, said inner face is recessed and hard babbitt 58 or such like material is poured into the recess. The means for lubricating the surfaces of the bearing is similar to that shown in Figure 1 with the exception that the hole 31 is carried through the washer or keeper plate 50 so that the lubricant will pass therethrough to the bearing parts. In Figures 6 and 7 the only modification that is made from Figures 4 and 5 lies in the construction of the bushing or keeper plates and all parts similar to Figures 4 and 5 are designated with like numerals. In Figure 6 the liner 42ª does not extend the full length of the bearing and the cylindrical bushing is made the same length as the liner. End washers 59 and 60 are placed at each end of the bushing to hold it in position. The washers extend from the inner wall of the bushing to the outer wall of the liner and the inner faces of said washers frictionally engage with the ends of the liner and bushing. In Figure 7 the rotatably mounted bushing 61 is made in halves and each half bushing is provided with a flange extending outwardly with its inner face engaging with the end of the liner. Oil tight packing rings 63 may be placed between the edges of the flange and the bearing in the devices where flanged bushings or washers are used, and in cases where plain bushings are used, the packing rings 64 may be placed between the bearing and the axles as shown in Figure 5.

It will be understood that the liners shown in Figures 6 and 7 may be freely mounted in the bearing or secured thereto in any suitable manner (not shown). In the drawing railway journal boxes are illustrated, but it will be readily understood that this construction of bearing may be employed for other uses without departing from the spirit of the invention.

In operation the bushing may rotate with the shafting or the shafting may rotate within the bushing, thereby reducing the possibility of a stoppage of the machine due to the binding or seizing of the bearing. The rotating surfaces are kept well supplied with oil through the side play or lateral movement of the axle, the pumping action of which causes the lubricant to flow to all running parts of the bearing. The grease or lubricant in the cap is compressed by the outward movement of the axle and seeks an outlet through the hole in the centre of the axle or between the keeper plate and the bushing or liner. The outward movement of the axles supplies oil to the running surfaces through the holes in the axle, and bushing, and the inward movement of the axle presses the grease that has gathered between the plates into the bearing. The centrifugal action of the grease or lubricant thrown from the surfaces of the keeper plate, and attaching means, assist in forcing the lubricant to the most vital parts of the bearing and forming an oil film between the revolving parts. This construction increases the efficiency of the bearing. The bushings being rotatably mounted in the liner are easily removed or replaced and provide a very simple repairing problem when compared with the ordinary type of bearing in which fixed bushings are used. By providing a liner which is replaceable, no wear takes place in the main part of the bearing, that is the casing. It has been found from experiment that bearings built in the manner disclosed are highly efficient in operation and need less attention than bearings wherein fixed bushings are used.

It has been found from actual experiment that a perfect circulation of the lubricant is kept up through the running or revolving parts of the bearing even though no lubricant passes through the hole in the centre of the axle. This may be accounted for by the pumping action of the lateral movement of the axle in the travelling of the locomotive. The lateral movement of said axle sets up a pressure in the sealed cap, which may be gauged by placing a pressure gauge or such like pressure recording instrument in the aperture occupied by the plug 57. This lubricating feature is particularly interesting as it has been discovered in actual test that a truck has completed a 15,000 mile run without replenishing the oil in the bearing. It was also found in this test that no overheating of the bearings occurred during the test, and the wear on the bushing was practically unnoticeable. It will be readily understood that bearings built in the manner disclosed are very economical in operation both as regards inspection required and lubricant needed for the operation of same.

Having thus described our invention, what we claim is;—

1. In an axle bearing for railway equipment, a journal bearing casting, a lubricant reservoir attached to one end of the bearing casting, a bushing rotatably mounted in the bearing, an axle rotatably mounted in said bushing and having limited movement in its longitudinal direction, said axle having an enlarged end portion positioned within the reservoir and adapted to circulate the lubricant in the reservoir and force said lubricant between the revolving parts of the bearing.

2. In an axle journal bearing, the combination of a journal bearing casting, a perforated bushing rotatably mounted in said casting, an axle journal rotatably mounted in said bushing and capable of a limited axial movement, a cap closing the outer end of the casting and forming a reservoir from which the lubricant is forced by the outer end of the journal during outward axial movement of the latter and means for conducting and distributing the lubricant thus forced from the reservoir to and over the bearing surfaces of the journal, bushing and casting, said means including a keeper plate fixed to and projecting laterally beyond the outer end of the journal and rotatable therewith to effect a centrifugal distribution of the lubricant whereby the latter is forced to the bearing surfaces of the journal and casting to form an oil film between the revolving parts.

3. The combination of a journal bearing casting, a lining secured therein and having grooves formed in its inner wall, a radially perforated bushing rotatably mounted in said lining, a journal rotatable in said bushing and formed with an axial bore extending inwardly from the outer end of the journal and communicating with a plurality of small passages extending radially between said bore and the bearing surface of the journal, said journal and perforated bushing being capable of limited axial movement with respect to the bearing, a cap closing the outer end of the casting and forming a reservoir from which the lubricant is pumped directly by the journal during outward axial movement of the latter.

4. The combination of a journal bearing casting, a lining secured therein and having grooves formed in its inner wall, a radially perforated bushing rotatably mounted in said lining, a journal rotatable in said bushing and capable of limited axial movement with respect to the bearing, a cap closing the outer end of the casting and forming a reservoir from which the lubricant is pumped directly by the journal during outer axial movement of the latter, and means affording a laterally projecting flange at the outer end of the journal, said flange being rotatable with the journal and serving to increase the pumping effect of the journal and to effect a centrifugal distribution of the lubricant to assist in forcing the latter to all parts of the bearing.

In witness whereof, we have hereunto set our hands.

WILLIAM F. J. CASEY.
GUSTAVE CAVIN.
CHARLES E. BROOKS.